United States Patent
Siliqi et al.

(10) Patent No.: US 10,338,257 B2
(45) Date of Patent: Jul. 2, 2019

(54) METHOD AND SYSTEM FOR SIMULTANEOUS SEISMIC DATA ACQUISITION OF MULTIPLE SOURCE LINES

(71) Applicant: CGG SERVICES SA, Massy (FR)

(72) Inventors: Risto Siliqi, Paris (FR); Damien Grenie, Limours (FR); Vetle Vinje, Oslo (NO); Fabrice Mandroux, Montrouge (FR)

(73) Assignee: CGG SERVICES SAS, Massy (FR)

( * ) Notice: Subject to any disclaimer, the term of this patent is extended or adjusted under 35 U.S.C. 154(b) by 59 days.

(21) Appl. No.: 15/210,111

(22) Filed: Jul. 14, 2016

(65) Prior Publication Data
US 2017/0017005 A1    Jan. 19, 2017

Related U.S. Application Data

(60) Provisional application No. 62/193,667, filed on Jul. 17, 2015, provisional application No. 62/197,580, filed on Jul. 28, 2015.

(51) Int. Cl.
    *G01V 1/38*    (2006.01)

(52) U.S. Cl.
    CPC .................. *G01V 1/3808* (2013.01)

(58) Field of Classification Search
    USPC ......................................................... 367/20
    See application file for complete search history.

(56) References Cited

U.S. PATENT DOCUMENTS

| 5,771,202 A | 6/1998 | Bale et al. |
| 8,531,912 B2 | 9/2013 | Soubaras |
| 8,593,904 B2 | 11/2013 | Soubaras |
| 8,792,296 B2 | 7/2014 | Soubaras |
| 9,134,446 B2 | 9/2015 | Soubaras |
| 2011/0044127 A1 | 2/2011 | Kostov et al. |
| 2011/0158044 A1 | 6/2011 | Moldoveanu et al. |
| 2012/0257474 A1* | 10/2012 | Cambois ............... G01V 1/3808 367/16 |
| 2012/0275264 A1 | 11/2012 | Kostov et al. |
| 2014/0041455 A1* | 2/2014 | Cloud .................. G01N 29/045 73/584 |
| 2014/0050047 A1 | 2/2014 | Soubaras |
| 2014/0198608 A1* | 7/2014 | Konno ................... G01V 1/201 367/16 |
| 2014/0254316 A1* | 9/2014 | Tenghamn ............... G01V 1/38 367/20 |
| 2014/0376330 A1 | 12/2014 | Howieson et al. |
| 2015/0331127 A1 | 11/2015 | Brookes et al. |

FOREIGN PATENT DOCUMENTS

| GB | 2488652 A | 9/2012 |
| WO | 02/25315 A2 | 3/2002 |

OTHER PUBLICATIONS

Extended European Search Report in corresponding European Application No. EP 16 30 5884 dated Nov. 25, 2016.

* cited by examiner

*Primary Examiner* — Daniel L Murphy
(74) *Attorney, Agent, or Firm* — Patent Portfolio Builders PLLC

(57) ABSTRACT

Systems and methods for reducing survey time while enhancing acquired seismic data quality are provided. Data corresponding to plural source lines are acquired simultaneously, using sources at cross-line distance at least equal to their illumination width, with at least one source being towed above a streamer spread.

18 Claims, 13 Drawing Sheets

METHOD AND SYSTEM FOR SIMULTANEOUS SEISMIC DATA ACQUISITION OF MULTIPLE SOURCE LINES

CROSS REFERENCE TO RELATED APPLICATIONS

The present application claims the benefit of priority under 35 U.S.C. § 119(e) to U.S. Provisional Application No. 62/193,667, filed on Jul. 17, 2015, and U.S. Provisional Application No. 62/197,580, filed on Jul. 28, 2015, the entire contents of which are hereby incorporated by reference into the present application.

TECHNICAL FIELD

Embodiments of the subject matter disclosed herein generally relate to methods and systems for seismic data acquisition of multiple source lines and, more particularly, to mechanisms and techniques for acquiring seismic data related to two or more sources along a sail line, with a single streamer spread.

BACKGROUND

In oil and gas exploration and exploitation, marine seismic surveys are an important tool for making drilling-related decisions. Seismic data acquired during such a survey is processed to generate a profile, which is a three-dimensional approximation of the geophysical structure under the seafloor. This profile enables those trained in the field to evaluate the presence or absence of oil and/or gas reservoirs, which leads to better management of reservoir exploitation. Enhancing seismic data acquisition and processing is an ongoing process.

FIG. 1 is a vertical-plane view of a generic marine survey setup 100. A vessel 101 tows a seismic source 102 (note that, for simplicity, the source's full configuration is not shown) and streamers (only one streamer 104 is visible in this view) in a towing direction T. When the seismic source is activated, seismic energy is emitted into the water and propagates into the rock formation under the seafloor 110. The seismic energy is partially reflected and partially transmitted at interfaces where the acoustic impedance changes, such as at the seafloor 110 and at an interface 112 inside the rock formation. Reflected energy may be detected by sensors or receivers 106 (e.g., hydrophones, geophones and/or accelerometers) carried by the streamers. The seismic data represents the detected energy.

The bird's-eye view in FIG. 2 shows that, upon activating seismic source 200, seismic data corresponding to an illumination area 210 having a width $I_1=D$ is acquired with a streamer spread 220 having a width $L_1=2\times D$. The illumination width is determined by multiple factors, such as the magnitude of emitted energy, energy attenuation along the propagation path from the source to the receiver via the underground formation, noise level, depth range of interest, receiver's sensitivity, etc. In this document, the term "illumination width" refers to a cross-line width that can be explored using a reference source.

Illumination area 210 is a locus of mid-points between the source activation location and receivers detecting reflected energy. If a receiver is at a cross-line distance x from the source activation location, then the mid-point is at a cross-line position x/2 from the source activation location. The term "cross-line" indicates a direction perpendicular to the towing direction T and to gravity g (both shown in FIG. 1). The streamer spread is made of plural streamers towed underwater in such a way as to maintain predetermined cross-line distances from one another. Six streamers towed at 50 m cross-line distance between adjacent streamers form a streamer spread with a cross-line width of 250 m. The streamer spread cross-line distance is the distance between the leftmost and rightmost streamers. For a spread configuration having M streamers with a distance between two consecutive streamers of d, the width is $(M-1)\times d$.

In order to acquire high-resolution data with this conventional marine seismic data acquisition system, the distance between adjacent sail lines (which are suggested by the arrows pointing in the towing direction) is $S_1=D$. Here the sail lines are defined by the streamer spread's trajectory, more specifically by the trajectory of the middle of the streamer spread. The bottom half of FIG. 2 illustrates the data acquisition system sailing along a sail line adjacent to the sail line along which the data acquisition represented in the upper half sails. High sail line density takes a long time and is, therefore, expensive.

Thus, there is a need to provide data acquisition systems and methods that would acquire high-resolution seismic data faster and at less cost than conventional approaches.

SUMMARY

Methods and systems acquire high-resolution seismic data faster and cheaper than conventional means by using plural sources having a large source separation, with at least one source towed above the streamer spread.

According to an embodiment, there is a method for seismic data acquisition that includes simultaneously towing N seismic sources (with N≥2) and a streamer spread. The seismic sources are towed along source lines that are at a source cross-line distance D there-between which is at least equal to an illumination width. At least one of the two seismic sources is towed above the seismic spread. The streamer spread, which has a spread cross-line width L larger than (N+1) times the source cross-line distance, is towed at a position relative to the seismic sources that allows receivers along streamers of the streamer spread to detect underground reflections of seismic waves generated by the seismic sources. The method further includes acquiring seismic data corresponding to the underground reflections while the streamer spread is towed along a sail line.

According to another embodiment, there is a marine seismic data acquisition system including N seismic sources (with N≥2), a streamer spread including plural streamers and towing equipment is configured to enable simultaneously towing the seismic sources and the streamer spread. The seismic sources are towed along source lines that are at a source cross-line distance D there-between, which is at least equal to an illumination width. The streamer spread, which has a cross-line width larger than (N+1) times the source cross-line distance, is towed at a position relative to the seismic sources that allows receivers along streamers of the streamer spread to detect underground reflections of seismic waves generated by the two seismic sources, at least one of the seismic sources being towed above the seismic spread.

According to another embodiment, there is a method for reducing a survey time for a given area relative to a base survey time achievable by sweeping the given area with a first seismic source and a streamer spread having a width substantially equal to twice a source illumination width. The method includes providing at least one second seismic source, and adding streamers to the streamer spread to extend a spread cross-line width to at least three times the source illumination width. The method further includes simultaneously towing the first and the at least one second seismic source along source lines that are at a source cross-line distance which is at least equal to the illumination width. The streamer spread is towed at a position relative to the first and the at least one second seismic source that allows receivers along streamers of the streamer spread to detect underground reflections of seismic waves generated by the first and the at least one second seismic source, at least one of the seismic sources being towed above the seismic spread. The method also includes acquiring seismic data corresponding to the underground reflections while the streamer spread is towed along a sail line.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic data acquisition. However, the current inventive concepts may be used for other types of surveys, such as surveys using electromagnetic waves or land surveys.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described in this section, high-resolution, efficient data acquisition is achieved using at least two seismic sources at a source cross-line distance at least equal to an illumination width, with at least one of the two sources being towed above the streamer spread.

Figure 1:
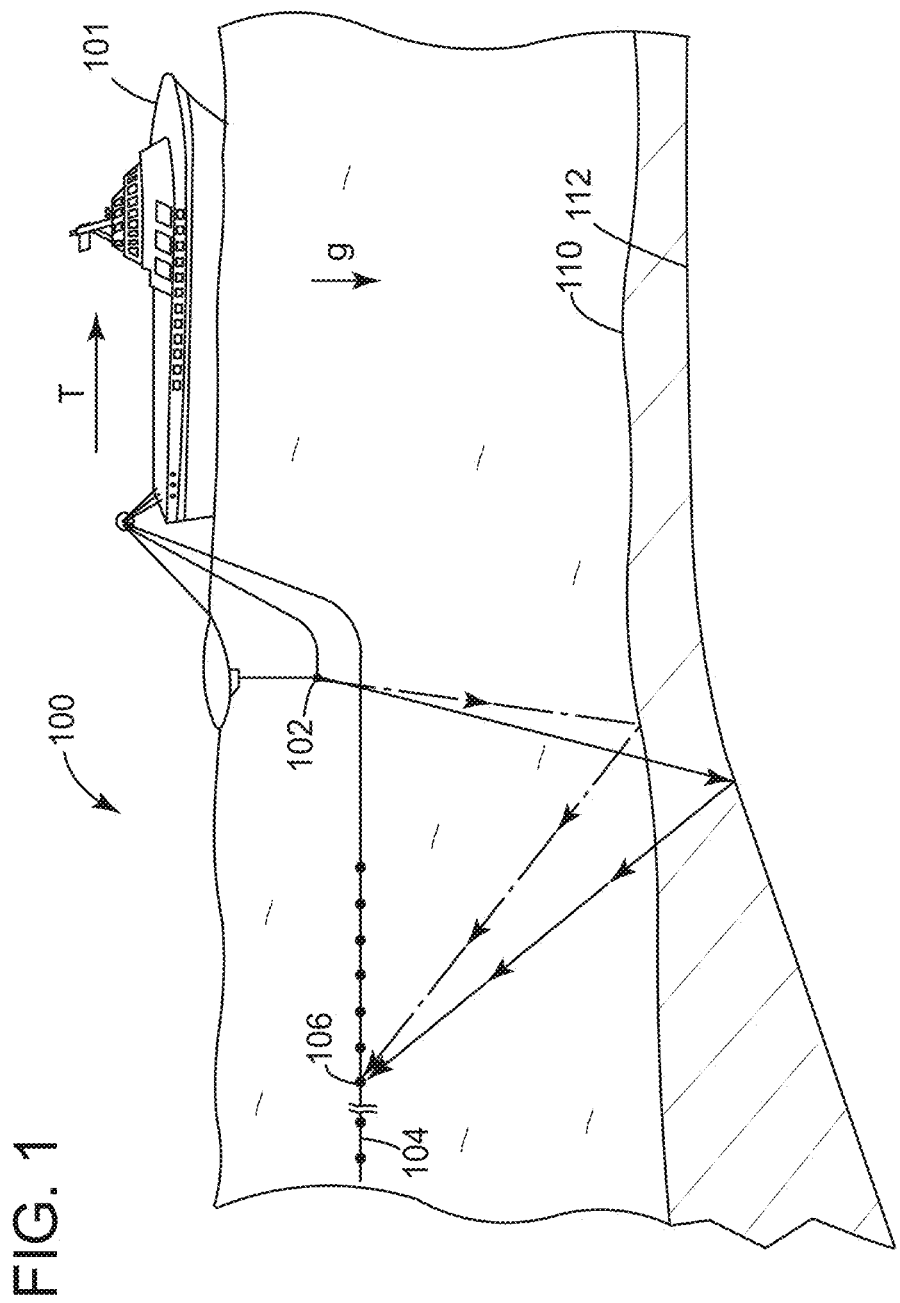
FIG. 1 illustrates a generic marine survey setup.
Figure 2:
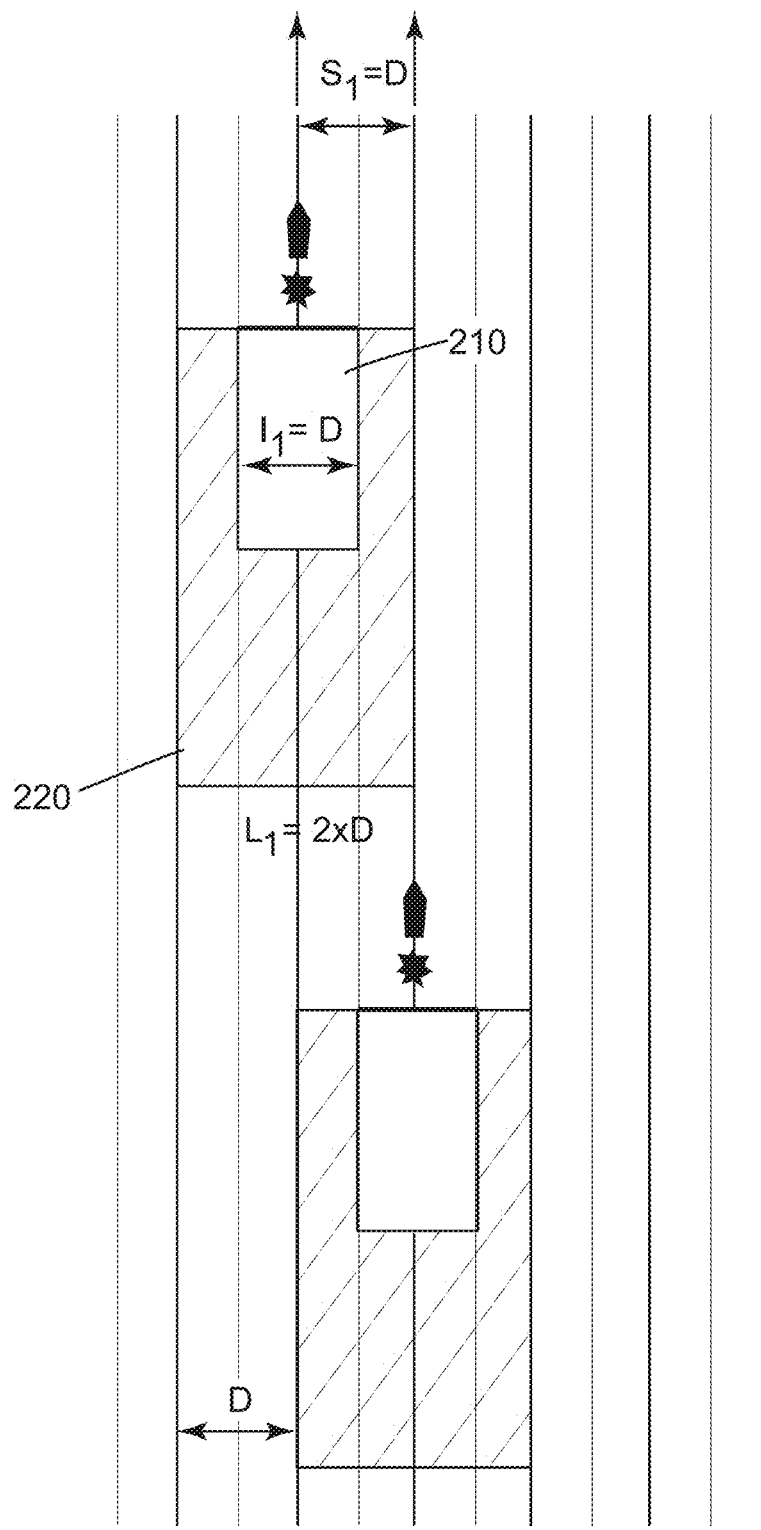
FIG. 2 is a bird's-eye view of a conventional marine survey system.
Figure 3:
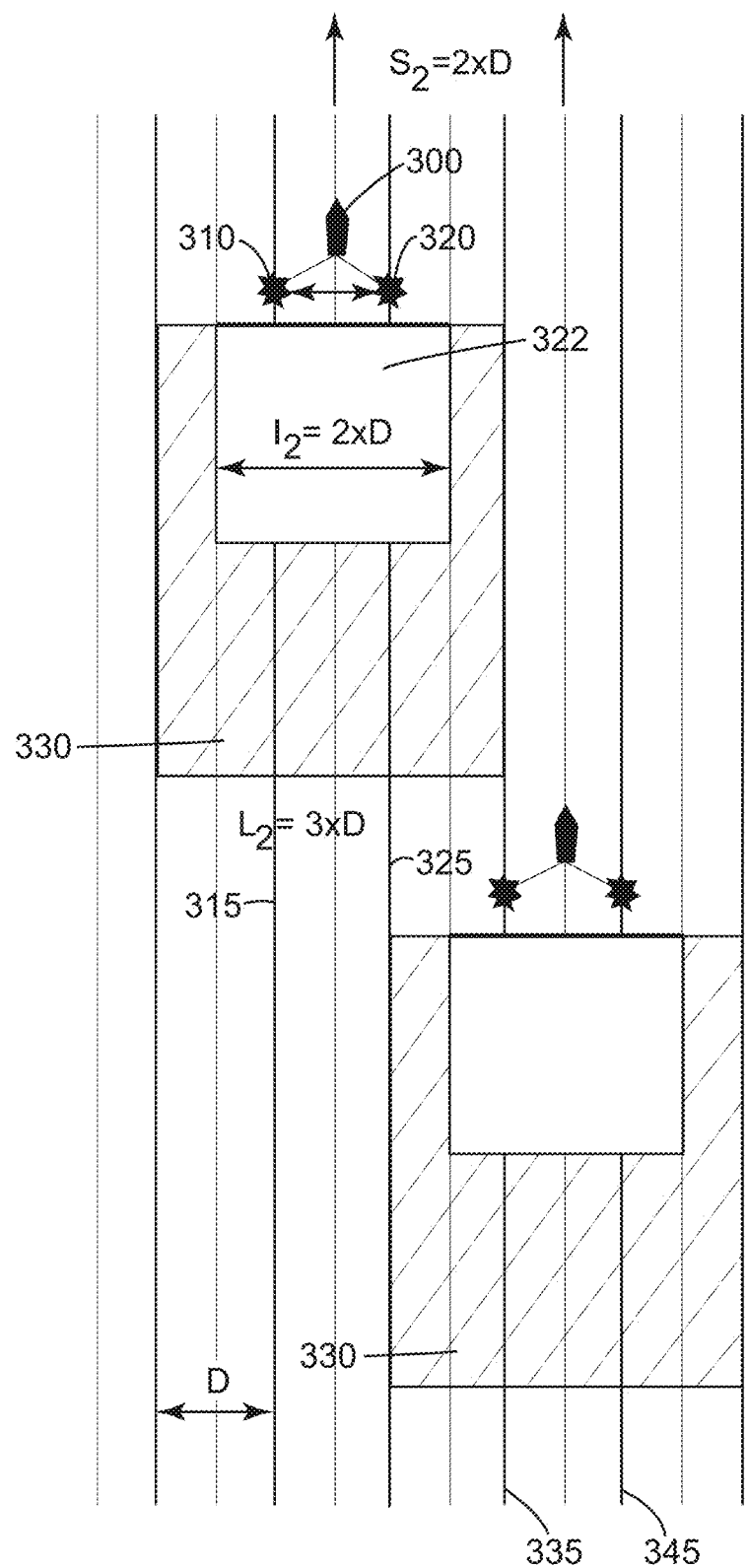
FIG. 3 is a bird's-eye view of a marine survey system with two sources having a large cross-line separation between them.

FIG. 3 is a bird's-eye view of a data acquisition system in which a vessel 300 tows two sources 310 and 320. These sources and sources in the other embodiments described in this section may be impulsive (e.g., air-guns) or non-impulsive (e.g., vibrators or detuned air-gun sources) or a combination of different type of sources. The sources follow source lines 315 and 325, respectively, at a cross-line distance equal to the illumination width, D, from one another. In FIG. 2, the source line is the same as the sail line, but in FIG. 3, two source lines correspond to each sail line. Sources 310 and 320 illuminate an area 322 of width $I_2 = 2 \times D$ if data is acquired using a streamer spread 330 having a spread cross-line width of at least $L_2 = 3 \times D$. For example, ten streamers towed at 50 m cross-line distance between adjacent streamers form a streamer spread with a cross-line width of 500 m. Distance between the sail lines (which are indicated by the up-pointing arrows) may then be doubled, $S_2 = 2 \times D$. In the embodiments described in this section, the receivers carried by the streamers may be single-sensor or multi-sensors (recording pressure and particle velocity or acceleration).

The bottom half of FIG. 3 illustrates the data acquisition system sailing along a sail line adjacent to the sail line along which the data acquisition represented in the upper half sails. On this adjacent sail line, the sources are towed along source lines 335 and 345. Note that the cross-line distance between the source lines (i.e., 315 to 325, 325 to 335, 335 to 345) is equal to illumination width D.

Based on a similar strategy, N sources simultaneously towed along source lines at D cross-line intervals may be used to illuminate an area with a cross-line width equal to $I = N \times D$ using a streamer spread having $L = (N+1) \times D$ spread cross-line width. The distance between adjacent sail lines may then be $S = N \times D$. Using such a data acquisition system, N source lines are acquired simultaneously for each sail line.

Figure 4:
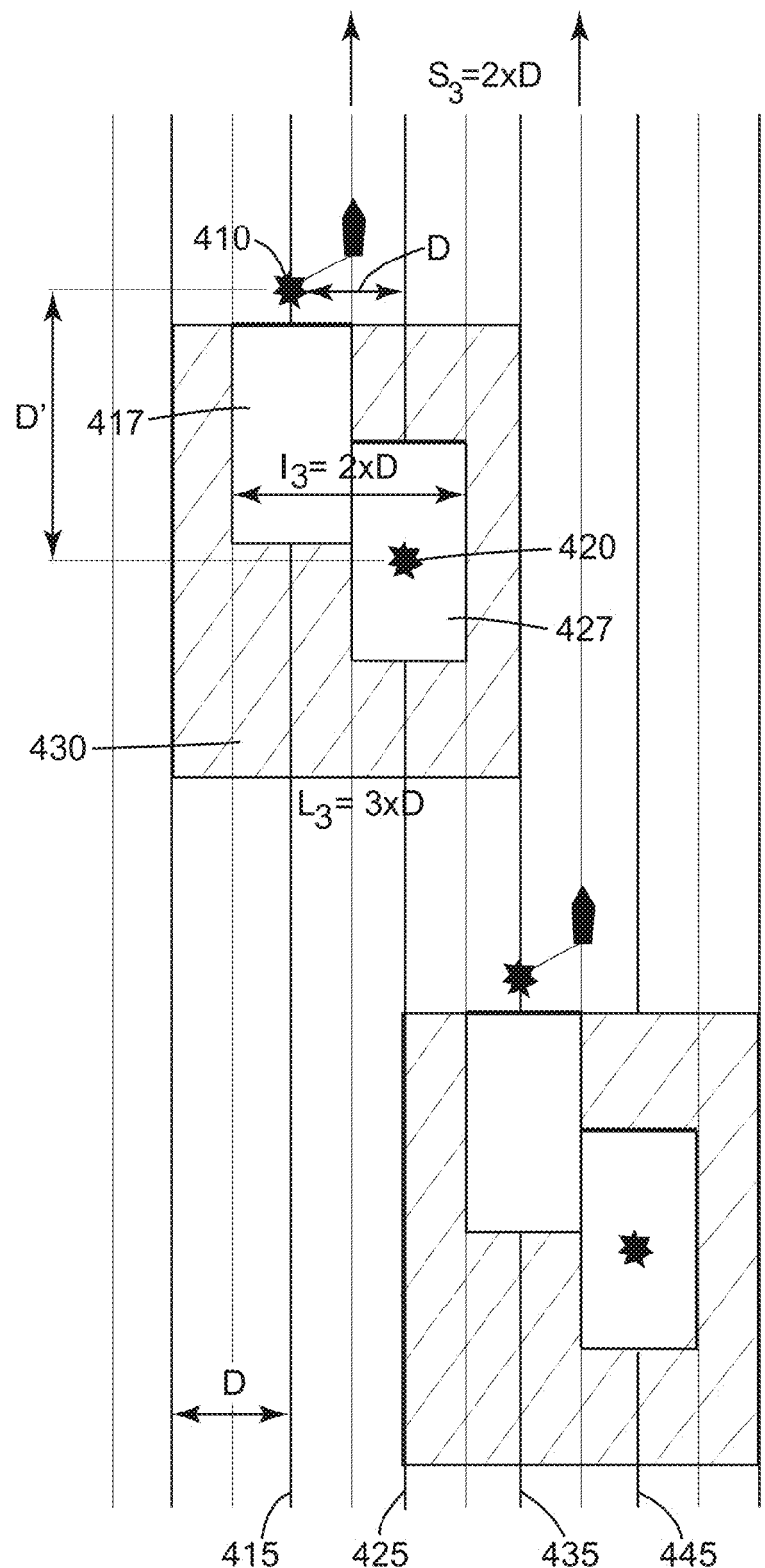
FIG. 4 is a bird's-eye view of a marine survey system according to an embodiment.

The data acquisition system illustrated in FIG. 3 may be further improved by towing one of the two sources above the streamer spread. FIG. 4 is a bird's-eye view of a marine survey system according to an embodiment. Similar to the marine data acquisition system in FIG. 3, this system includes two sources 410 and 420 towed along source lines 415 and 425, respectively, at a cross-line distance equal to illumination width D from one another. However, in this system, the sources are also at an inline distance D' (the inline direction is the towing direction), with source 420 towed above the spread 430. For example, distance D' may be about 3 km, the streamers may be towed at depths between 25 m and 50 m, and seismic source 420 is towed at depths between 5 and 20 m. The streamers may be instrumented with depth controlling devices to be towed while maintaining a depth-varying depth as described, for example, in U.S. Pat. Nos. 9,134,446, 8,531,912, 8,593,904, 8,792,296 and U.S. Patent Application Publication No. 2014/0050047.

In this case, sources 410 and 420 illuminate adjacent but inline-shifted rectangular areas 417 and 427, respectively. The term "inline" relates to the towing direction. The width of the area illuminated by sources 410 and 420 is $I_3 = 2 \times D$.

A streamer spread having a cross-line width of at least $L_3=3\times D$ is used to acquire seismic data related to both sources. The distance between adjacent sail lines is $S_3=2\times D$. The bottom half of FIG. 4 illustrates the data acquisition system sailing along a sail line adjacent to the sail line along which the data acquisition represented in the upper half sails. As in FIG. 3, the cross-line distance between adjacent source lines (i.e., 415 to 425, 425 to 435, 435 to 445) related to the same or adjacent sail lines is equal to illumination width D.

The advantage of acquiring data with a source towed above the streamer is increased azimuth coverage, since the streamer spread is able to record reflections coming from all directions for this source. Here, the azimuth is an angle in horizontal plane, between the towing direction and a line from the source-activation location to the receiver location. Thus, for the source towed above the streamer spread, azimuth range is 0° to 360°.

In FIG. 4, the sources and the streamer spread are towed by the same single vessel. However, practical considerations lead to using the marine data acquisition system in FIG. 5 to acquire seismic data having the same quality (density and azimuth coverage) as the FIG. 4 system. The marine data acquisition system in FIG. 5 uses two vessels 500 and 501 to tow sources 510 and 520, respectively. Vessel 500 also tows streamer spread 530, which includes extra streamers 532 to balance the towed load. The spread cross-line width of streamer spread 530 is $L_4=4\times D$. As in FIGS. 3 and 4, sources 510 and 520 are towed along source lines such as 515 and 525 while on a first sail line (as in the upper half of FIG. 5), or 535 and 545 (as in the lower half of FIG. 5) while on an adjacent second sail line. The cross-line distance between adjacent source lines remains equal to illumination width D. The cross-line distance between the adjacent sail lines is $S_4=2\times D$ and the illumination width $I_4=2\times D$.

Figure 6:
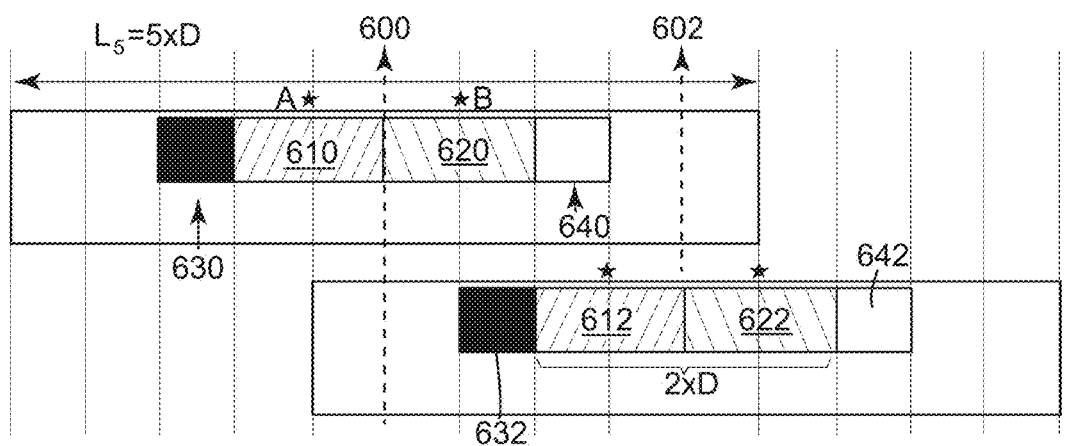
FIG. 6 is graphic representation related to a marine survey system according to another embodiment.

In order to make more homogeneous the fold of the illumination imprint of both sources (aspect that is more extensively discussed later), the spread width could be extended with extra outer streamers. For N sources, in order to achieve a homogenous-fold illumination width $N\times D$, the streamer spread width is $(N+3)\times D$. For example, for two sources, the streamer spread may be extended to a width of $5\times D$. FIG. 6 shows that in addition to the horizontal illumination $2\times D$ of adjacent illumination areas 610 and 620 corresponding to sources A and B at a distance D therebetween, seismic data related to symmetric areas 630 and 640 may be acquired with the $5\times D$-wide streamer spread sailing along sail-line 600. The lower part of FIG. 6 illustrates similar areas 612-642 (corresponding to 610-640) when the data acquisition system including a $5\times D$-wide streamer spread sails along sail-line 602, adjacent to sail line 600. The cross-line distance between the adjacent sail lines remains $2\times D$. If a $4\times D$ streamer spread is used, then seismic data corresponding to areas 630 and 632 can be acquired but seismic data corresponding to areas 640 and 642 cannot be acquired; therefore, the seismic data would not have uniform quality over the surveyed area.

Figure 5:
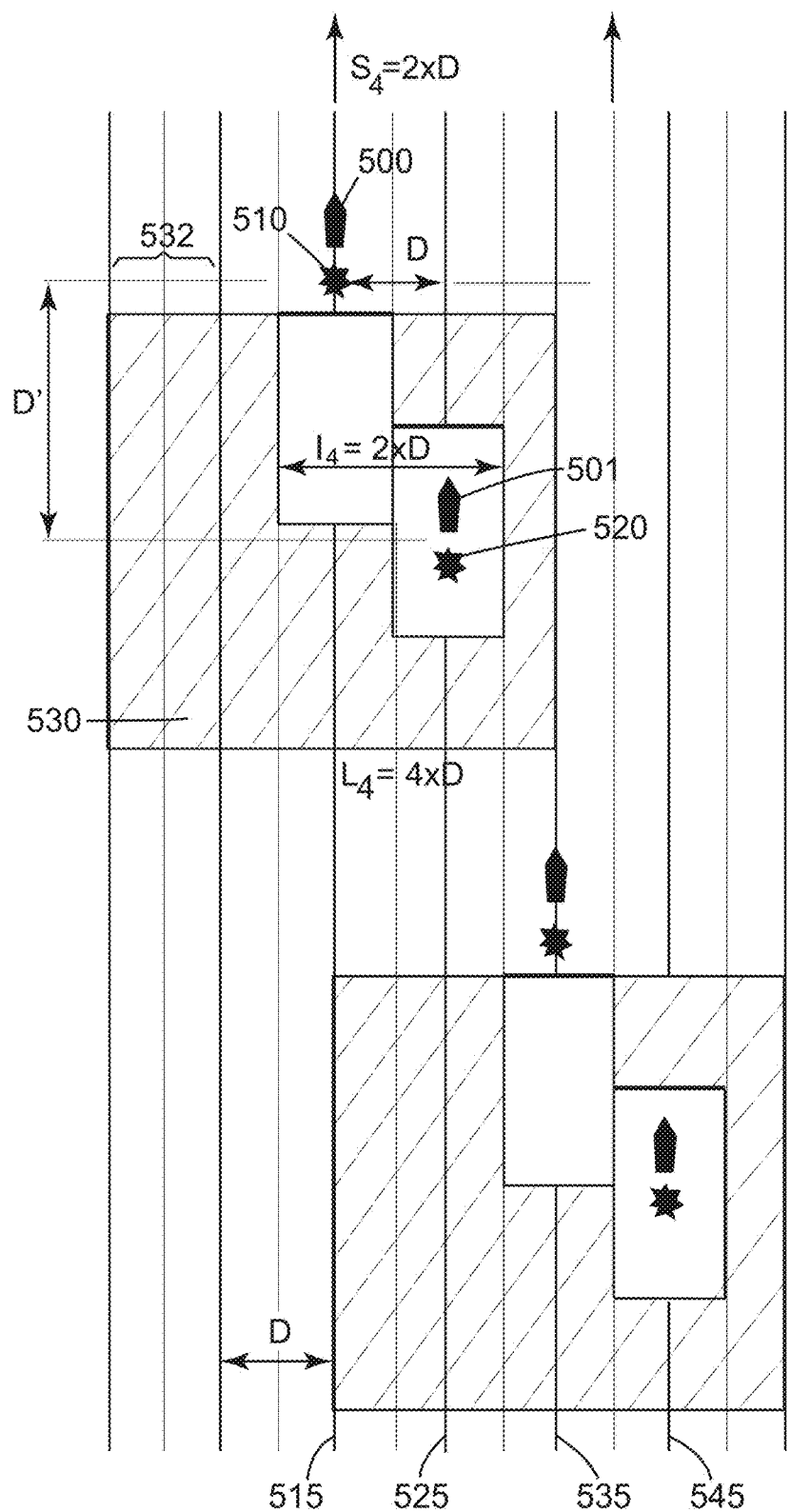
FIG. 5 is a bird's-eye view of a marine survey system according to another embodiment.

Variations of the data acquisition systems in FIGS. 4 and 5 may have both sources towed above the streamer spread. The source lines may also be symmetric relative to a line parallel to the towing direction at half width of the streamer spread.

A technique employed to achieve more seismic data diversity enabling smaller bin sizes is to use dual sources. A dual source includes two individual sources separated by a cross-line distance equal to half the distance between the streamers in the streamer spread. The individual sources are towed symmetrically lateral relative to the source line. The individual sources are activated in a flip-flop mode. Using dual sources allows more meaningful and smaller cross-line bins than when a single individual source is used.

Figure 7:
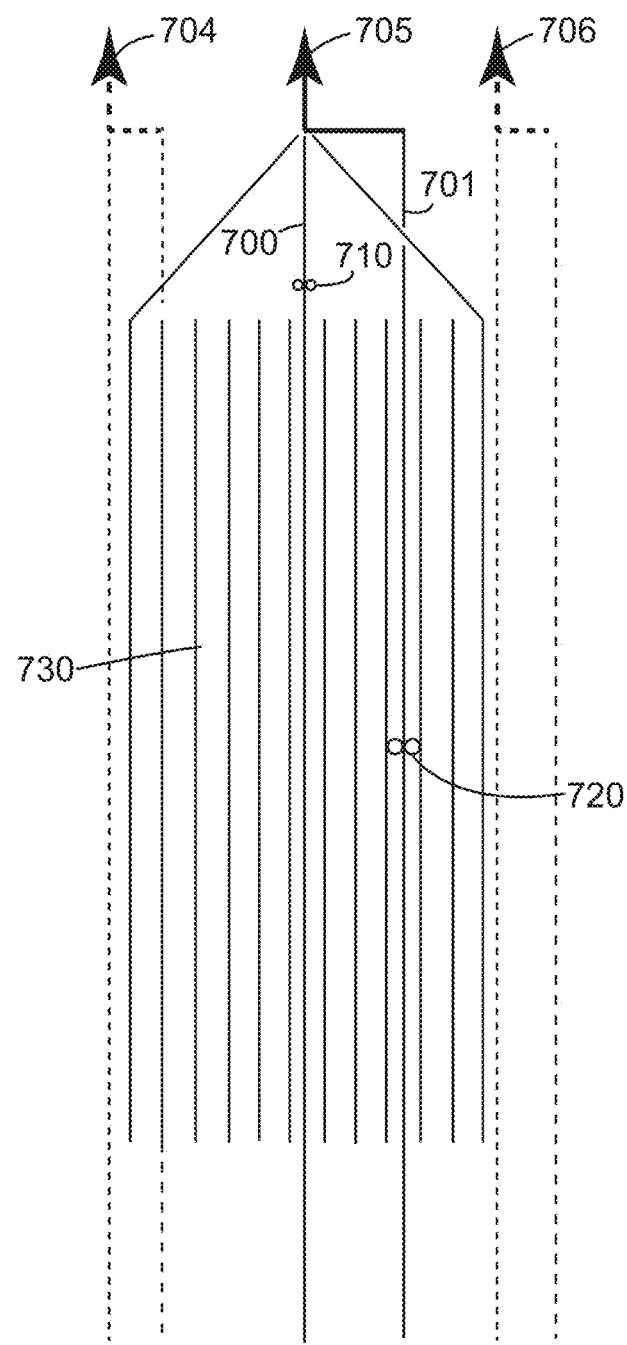
FIG. 7 is a bird's-eye view of a marine survey system according to another embodiment.
Figure 8:
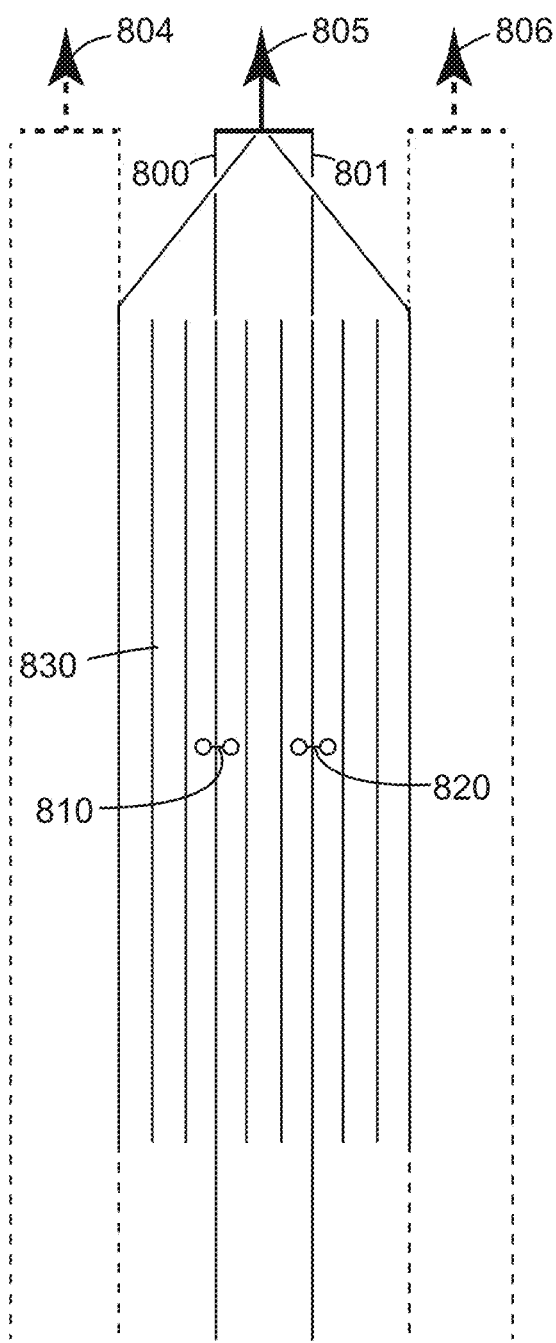
FIG. 8 is a bird's-eye view of a marine survey system according to another embodiment.
Figure 9:
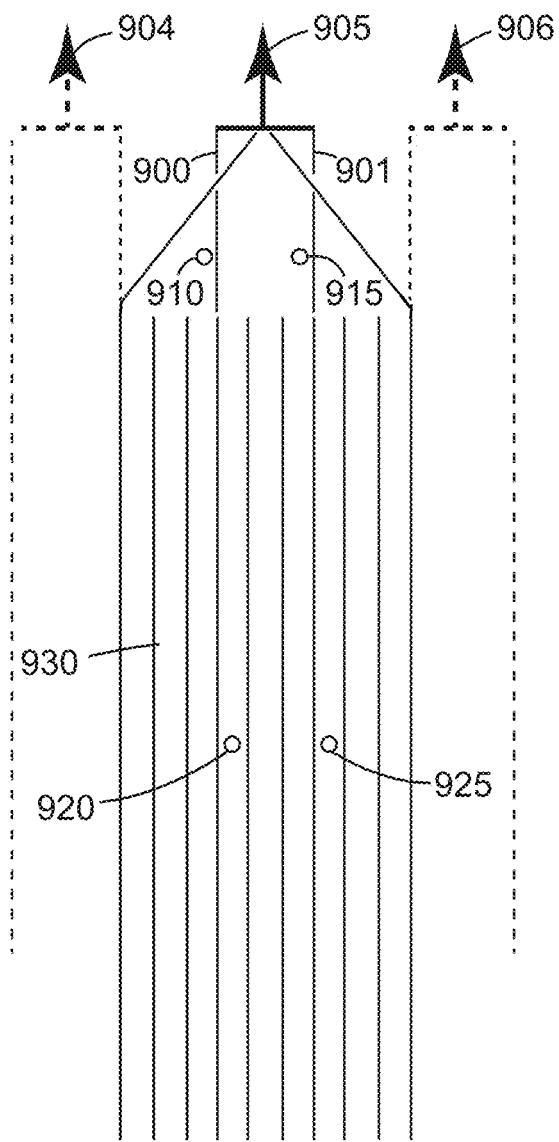
FIG. 9 is a bird's-eye view of a marine survey system according to yet another embodiment.

FIGS. 7-9 illustrate embodiments using dual or plural sources towed along source lines at a source cross-line distance equal to the illumination width, with some sources towed above the streamer spread. The number of streamers and distances there-between specified in the descriptions are merely illustrations, not intended to be limiting. These source arrangements put the individual sources at different cross-line distances from the streamers, enabling binning the seismic data in smaller interleaved bins.

FIG. 7 illustrates a data acquisition system including dual sources 710 and 720, with source 720 towed over streamer spread 730. Streamer spread 730 includes twelve streamers at 50 m cross-line distance from one another. Source line 700 corresponding to source 710 coincides with sail line 705, and is at D=150 m from source line 701 corresponding to source 720. The individual sources of dual sources 710 and 720 are shifted about 12.5 m cross-line relative to the respective source lines 700 and 701.

Source line 700 is substantially in the middle of the streamer spread and about half cross-line distance between the $6^{th}$ and $7^{th}$ streamers (counting from left to right). Source line 701 is about half cross-line distance between the $9^{th}$ and $10^{th}$ streamers. FIG. 7 also indicates (using dashed lines) the sail lines 704 and 706 and corresponding source lines adjacent to sail line 705, along which the illustrated system sails.

FIG. 8 illustrates a data acquisition system including dual sources 810 and 820, both sources being towed over streamer spread 830. Streamer spread 830 includes ten streamers at 50 m cross-line distance from one another. Source line 800 corresponding to source 810 and source line 801 corresponding to source 820 are at D=150 m from one another and symmetric relative to sail line 805. Source lines 800 and 801 overlap the $4^{th}$ and $7^{th}$ streamers respectively. The individual sources of dual sources 810 and 820 are shifted about 12.5 m cross-line relative to the respective source lines 800 and 801. FIG. 8 also indicates (using dashed lines) sail lines 804 and 806 and the corresponding source lines adjacent to sail line 805 along which the illustrated system sails.

FIG. 9 illustrates a data acquisition system including four sources 910, 915, 920 and 925. Sources 910 and 915 are towed ahead of the streamer, while sources 920 and 925 are towed over streamer spread 930. Similar to streamer spread 830, streamer spread 930 includes ten streamers at 50 m cross-line distance from one another. Individual sources 910 and 920 are at 12.5 m cross-line from source line 900, and individual sources 915 and 925 are at 12.5 m cross-line from source line 901. Source line 900 is at D=150 m from source line 901, the source lines being symmetric relative to sail line 905. FIG. 9 also indicates (using dashed lines) sail lines 904 and 906 and the corresponding source lines adjacent to sail line 905 along which the illustrated system sails.

Sources 910, 915, 920 and 925 may be of different types. In one embodiment, sources 910 and 915 are air gun-type, while sources 920 and 925 are vibrator-type. The sources may emit different excitations with different frequencies (bandwidth or sweeps) or may be towed at different depths.

Figure 10:
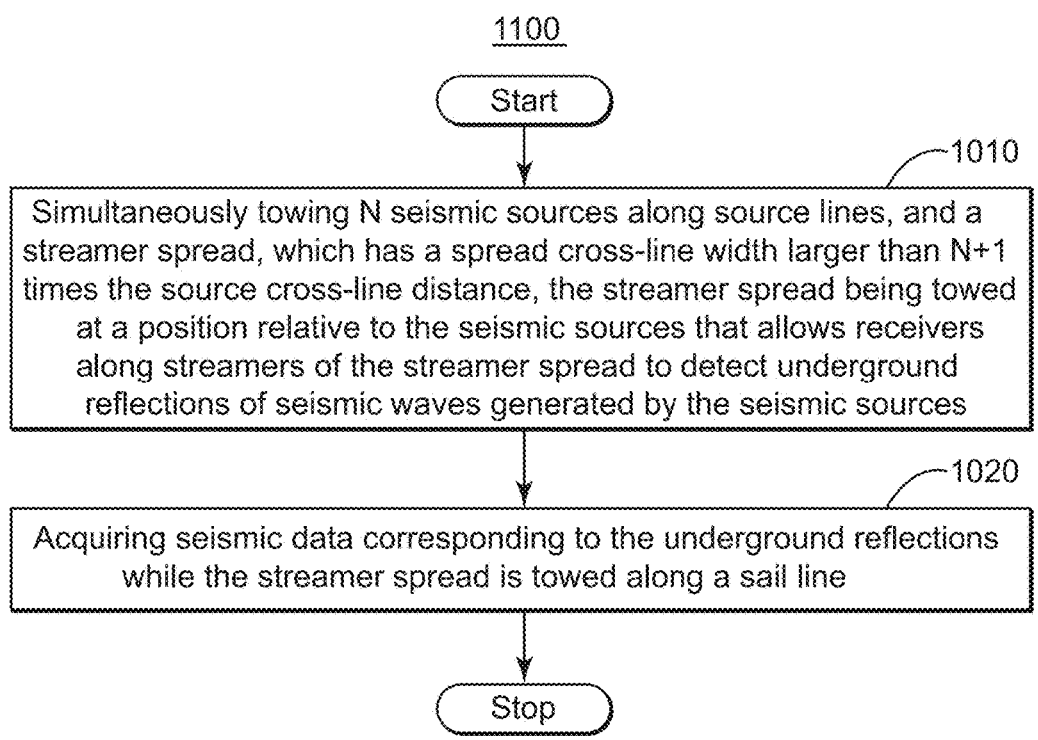
FIG. 10 is a flowchart of a method for seismic data acquisition, according to an embodiment.

FIG. 10 is a flowchart of a method 1000 for seismic data acquisition, according to an embodiment. Method 1000 includes simultaneously towing two seismic sources along source lines at a source cross-line distance D at least equal to an illumination width, and a streamer spread at 1010. More than two (i.e., N>2) seismic sources may be used. The streamer spread has a spread cross-line width larger than three times the source cross-line distance, and is towed at a position relative to the two seismic sources that allows receivers along streamers of the streamer spread to detect underground reflections of seismic waves generated by the two seismic sources. If N>2 sources having cross-line distances there-between at least equal to an illumination width are used then the streamer spread has a width at least equal to (N+1)×D. At least one of the seismic sources is towed above the spread. The source may be towed above the spread by a vessel other than the vessel towing the streamer spread. The source(s) may be towed about a middle of an inline length of the streamers, the inline length extending along the towing direction.

Method 1000 further includes acquiring seismic data corresponding to the underground reflections while the streamer spread is towed along a sail line, at 1020. Thus, seismic data corresponding to two (or more) source lines is acquired simultaneously, decreasing the survey time.

At least one of the two seismic sources may be a dual source activated in a flip-flop mode. In one embodiment, both seismic sources are dual sources activated in a flip-flop mode, with an individual source from one dual source activated simultaneously with an individual source of the other dual source. The source lines may be substantially symmetric relative to the sail line.

The streamers may have a depth-varying profile while towed. The streamers may be towed at depths between 25 m and 50 m, and the two seismic sources may be towed at depths between 5 m and 20 m. Beyond specific ranges, the streamers are towed such as to allow towing a source over them. The sources may be multi-level (i.e., having source elements at different depths, e.g., at 6, 10 and 15 m).

The source cross-line distance, a cross-line distance between adjacent sail lines and the spread cross-line width, may be selected so as to minimize fold variation in the seismic data.

Figure 11:
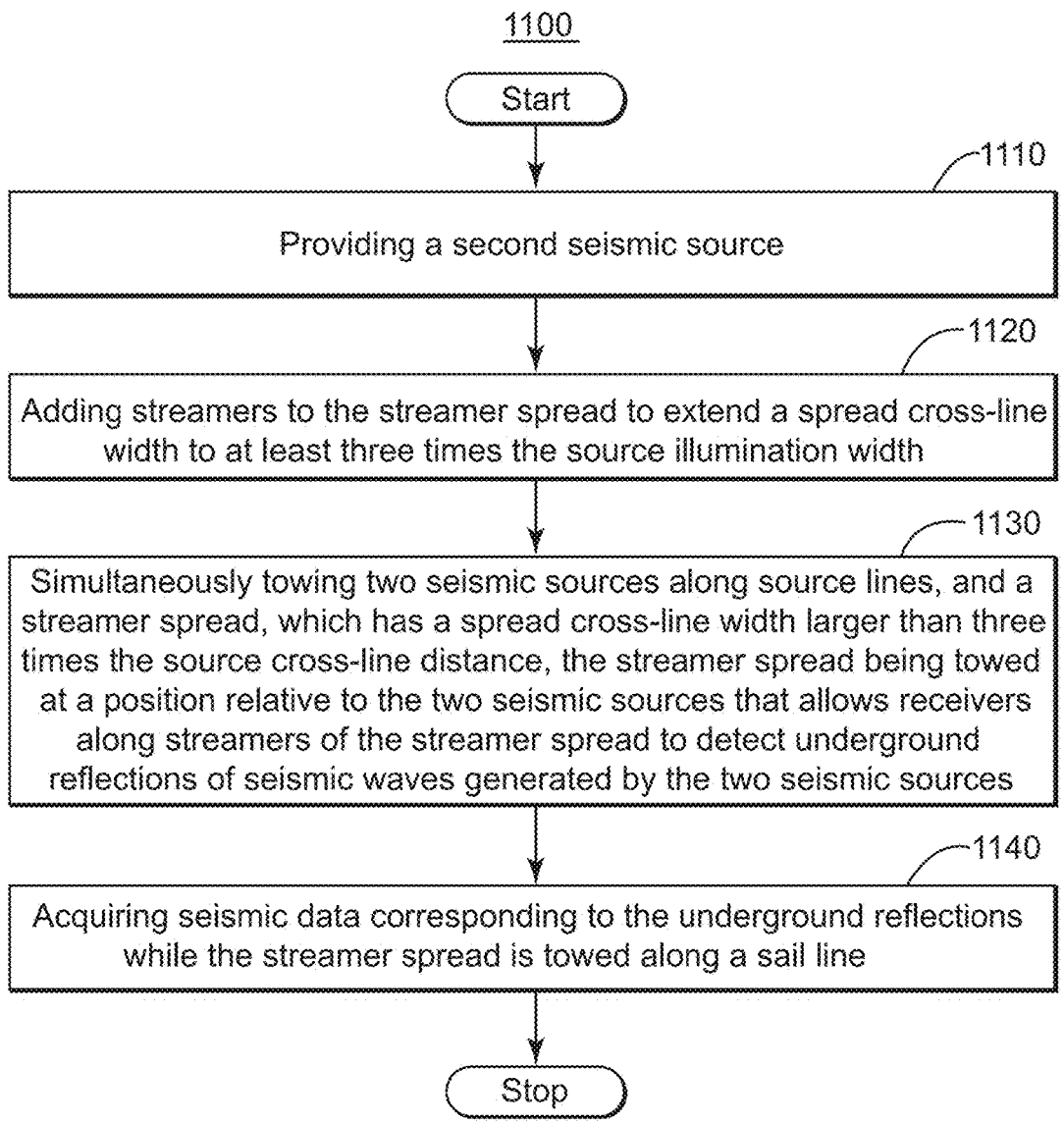
FIG. 11 is a flowchart of a method for reducing a survey time, according to an embodiment.

In view of the above-described data-acquisition-related techniques, there is a method for reducing a survey time for a given area relative to a base survey time achievable by sweeping the given area with a first seismic source and a streamer spread having a width substantially equal to twice a source illumination width. FIG. 11 is a flowchart illustrating steps of such a method. Method 1100 includes providing a second seismic source, at 1110, and adding streamers to the streamer spread to extend a spread cross-line width to at least three times the source illumination width, at 1120.

Method 1100 further includes, at 1130, simultaneously towing the first and second seismic sources along source lines, and the streamer spread at a position relative to the first and second seismic source, which allows receivers along streamers of the streamer spread to detect underground reflections of seismic waves generated by the first and the second seismic sources, with at least one of the first and second seismic source towed above the seismic spread. A source cross-line distance between the source lines is at least equal to the illumination width. In a broader view more sources may be added and the streamer spread width is then adequately extended. For example, if N>2 seismic sources are towed simultaneously at distances there-between at least equal to the illumination width D, the streamer spread width is at least (N+1)×D.

Method 1100 then includes acquiring seismic data corresponding to the underground reflections while the streamer spread is towed along a sail line, at 1140.

Figure 12:
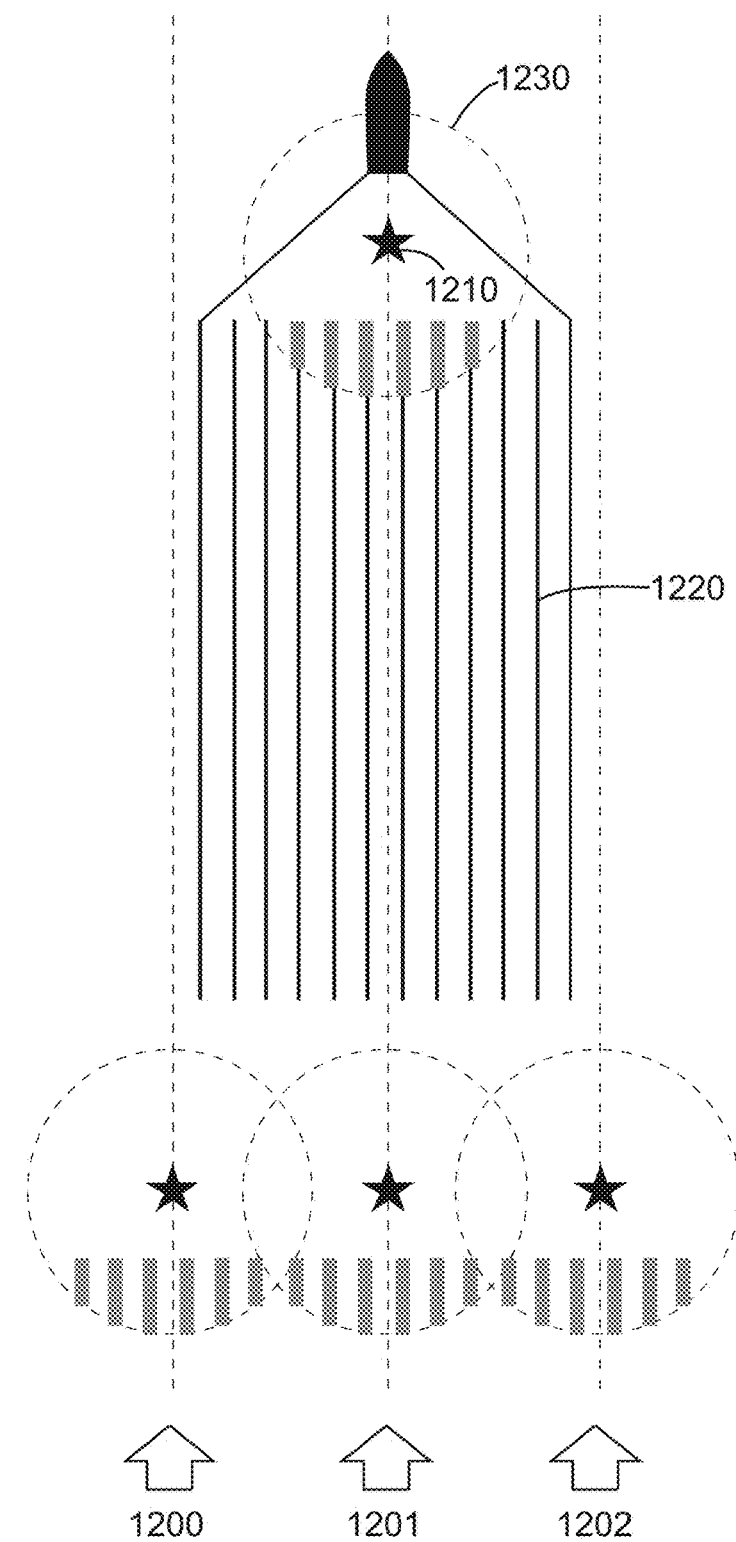
FIG. 12 is an illustration of near-field data acquisition with a conventional data acquisition system.

Towing the sources over the spread has the advantage that the cross-line distribution of near-offsets data is substantively enhanced, making it possible to acquire data even for zero-offset. To illustrate this feature consider a comparison between FIGS. 12 and 13. FIG. 12 illustrates a conventional marine data acquisition system having source 1210 towed ahead of streamer spread 1220. Circle 1230 emphasizes the location of receivers recording near-offset data (i.e., the thicker lines within this circle) when the conventional marine data acquisition system is towed along sail line 1201. At the bottom of FIG. 12, data in circle 1230 is reproduced with a center B for the source position on the corresponding source line (here the same as the sail line), next to corresponding data (in circles centered on A and C for the source positions along source lines respectively) acquired when this conventional marine data acquisition system is towed along adjacent sail lines 1200 and 1202.

Figure 13:
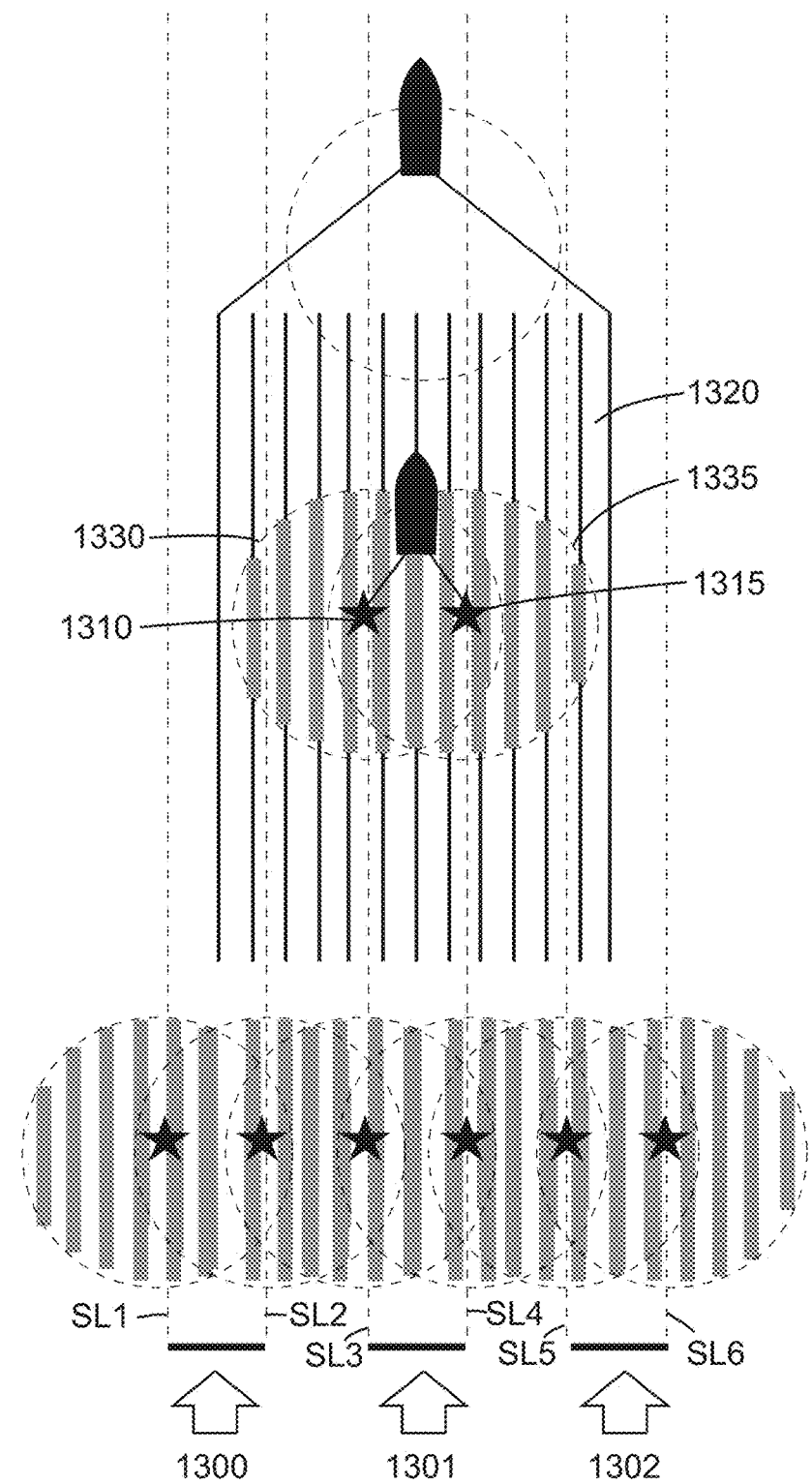
FIG. 13 is an illustration of near-field data acquisition with a data acquisition system according to an embodiment.

FIG. 13 illustrates a marine data acquisition system having two sources 1310 and 1315 towed above of streamer spread 1320. The cross-line distance between the sources is substantially equal to the sources' illumination width. Overlapping circles 1330 and 1335 emphasize the location of receivers recording near-offset data (again, the thicker lines within the circles) acquired when the marine data acquisition system is towed along sail line 1301. Note that data corresponding to two sail lines is acquired when this marine data acquisition system sails along one sail line.

At the bottom of FIG. 13, circles 1330 and 1335 are reproduced with the sources in the center on the corresponding source lines SL3 and SL4, next to corresponding circles with the sources along source lines SL1, SL2, SL5 and SL6 showing the receivers acquiring near-offset data when this marine data acquisition system towed along adjacent sail lines 1300 and 1302. A visual comparison of the bottom portions of FIGS. 12 and 13 reveals the substantive quantity and quality improvement of the near-offset data when sources are towed above the streamer spread.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic data acquisition, the method comprising:
   simultaneously towing
      N seismic sources along source lines that are at a source cross-line distance D there-between, the source cross-line distance being equal to or larger than an illumination width, with N≥2, and
      a streamer spread, which has a spread cross-line width L equal to or larger than (N+1) times the source cross-line distance, wherein each of the N seismic sources is towed in a middle of a respective illumination-width segment that sweeps an individual area inside an area swept by the streamer spread, at least one of the N seismic sources is towed over the streamer spread and at least another one of the N seismic sources is towed ahead of the streamer spread; and acquiring seismic data corresponding to underground reflections of seismic waves generated by the N sources while the streamer spread is towed along a sail line, wherein individual areas swept by different illumination-width segments do not overlap.

2. The method of claim 1, wherein the at least one of the N seismic sources is towed about a middle of an inline length of the streamers.

3. The method of claim 1, wherein one of the N seismic sources is a dual source activated in a flip-flop mode.

4. The method of claim 1, wherein the N seismic sources are dual sources activated in a flip-flop mode, one individual source from each of the N seismic sources being activated simultaneously.

5. The method of claim 1, wherein, in a horizontal plane, the source lines are substantially symmetric relative to the sail line.

6. The method of claim 1, wherein at least one streamer of the streamer spread has depth varying profile while towed.

7. The method of claim 1, wherein streamers of the streamer spread are towed at depths between 25 m and 50 m, and the N seismic sources are towed at depths between 5 m and 20 m.

8. The method of claim 1, wherein at least one of the N seismic sources is a multi-level seismic source.

9. The method of claim 1, wherein the least one of the N seismic sources is towed above the streamer spread by a vessel other than a vessel towing the streamer spread.

10. A marine seismic data acquisition system comprising:
N seismic sources, where N≥2;
a streamer spread including plural streamers; and
a towing equipment configured to enable simultaneously towing
the N seismic sources along source lines that are at a source cross-line distance there-between, the source cross-line distance being equal to or larger than an illumination width, and
the streamer spread, which has a cross-line width equal to or larger than (N+1) times the source cross-line distance, wherein each of the N seismic sources is towed in a middle of a respective illumination-width segment that sweeps an individual area inside an area swept by the streamer spread, at least one of the N seismic sources is towed over the streamer spread and at least another one of the N seismic sources is towed ahead of the streamer spread,
wherein individual areas swept by different illumination-width segments do not overlap.

11. The marine seismic data acquisition system of claim 10, wherein the towing equipment enables towing the at least one of the seismic sources over the streamer spread about a middle of an inline length of the streamer spread, the inline length extending along the towing direction.

12. The marine seismic data acquisition system of claim 10, wherein the seismic sources are dual sources activated in a flip-flop mode, source arrays of the seismic sources being activated simultaneously.

13. The marine seismic data acquisition system of claim 10, wherein, the towing equipment is configured to enable the source lines to be substantially symmetric relative to the sail line, in a horizontal plane.

14. The marine seismic data acquisition system of claim 10, wherein the towing equipment enables at least one streamer of the streamer spread to have a depth varying profile while towed.

15. The marine seismic data acquisition system of claim 10, wherein towing equipment enables the streamer spread to be towed at depths between 25 m and 50 m, and the seismic sources to be towed at depths between 5 m and 20 m.

16. The marine seismic data acquisition system of claim 10, wherein at least one of the seismic sources is a multi-level seismic source.

17. The marine seismic data acquisition system of claim 10, further comprising:
a first vessel attached to tow the streamer spread; and
a second vessel attached to tow the at least at least one of the seismic sources above the streamer spread.

18. A method for reducing a survey time for a given area relative to a base survey time achievable by sweeping the given area with a first seismic source and a streamer spread having a width substantially equal to twice a source illumination width, the method comprising:
providing a second seismic source;
adding streamers to the streamer spread to extend a spread cross-line width to at least three times the source illumination width;
simultaneously towing
the first and the second seismic source along source lines at a source cross-line distance that is equal to or larger than the illumination width, the cross-line distance being perpendicular to a towing direction, and
the first and the second seismic source are each towed in a middle of a respective illumination-width segment that sweeps an individual area inside an area swept by the streamer spread, the first seismic source is towed over the streamer spread and the second seismic source is towed ahead of the streamer spread; and
acquiring seismic data corresponding to underground reflections of seismic waves generated by the first and second seismic source while the streamer spread is towed along a sail line,
wherein individual areas swept by different illumination-width segments do not overlap.

* * * * *